Dec. 7, 1948.  R. P. DORIAN  2,455,742
PIPE GRINDER
Filed June 26, 1946  4 Sheets-Sheet 1

Rudolph P. Dorian
INVENTOR.

BY
HIS ATTORNEY.

Dec. 7, 1948.  R. P. DORIAN  2,455,742
PIPE GRINDER
Filed June 26, 1946  4 Sheets-Sheet 2
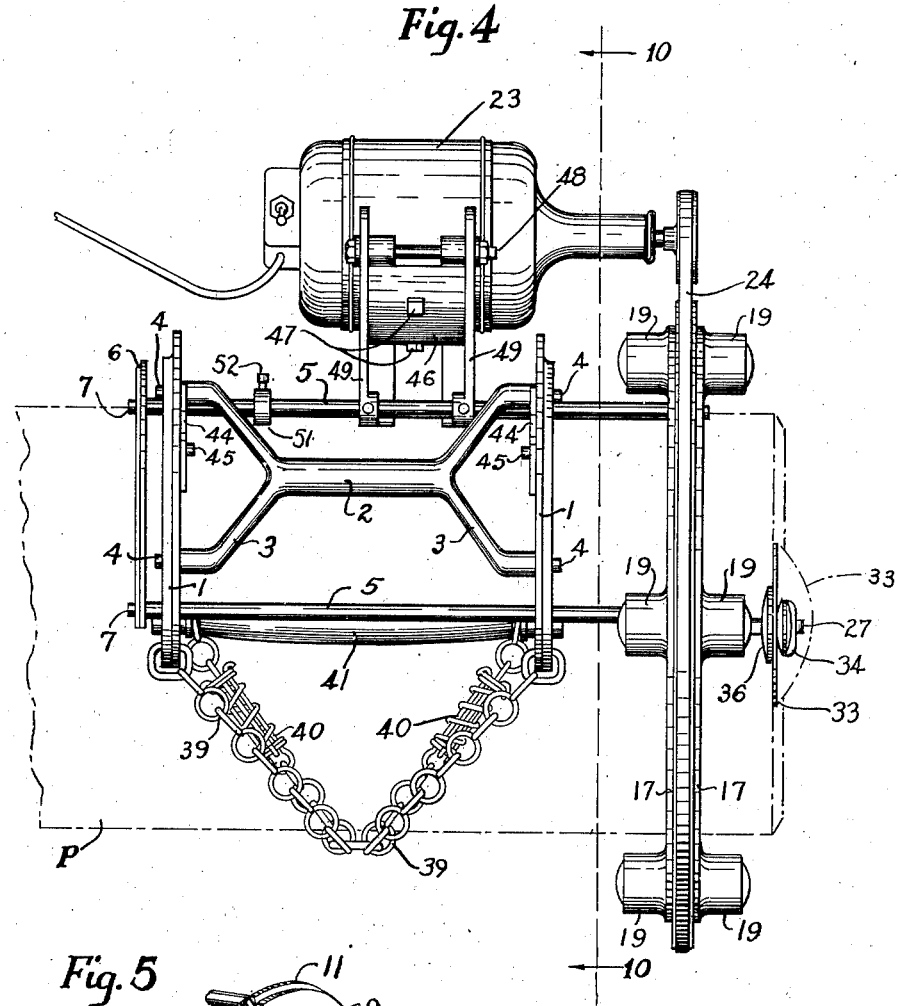
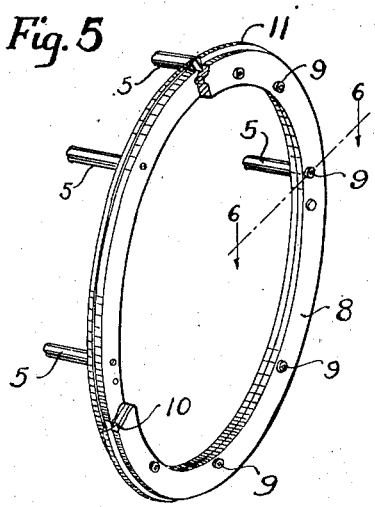
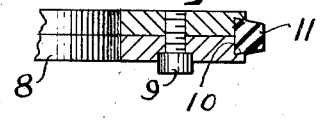
Rudolph P. Dorian
INVENTOR.
HIS ATTORNEY.

Dec. 7, 1948.   R. P. DORIAN   2,455,742
PIPE GRINDER
Filed June 26, 1946   4 Sheets-Sheet 3

Rudolph P. Dorian
INVENTOR.

BY
HIS ATTORNEY.

Dec. 7, 1948.   R. P. DORIAN   2,455,742
PIPE GRINDER

Filed June 26, 1946   4 Sheets-Sheet 4

Rudolph P. Dorian
INVENTOR.

BY
HIS ATTORNEY.

Patented Dec. 7, 1948

2,455,742

UNITED STATES PATENT OFFICE 2,455,742

PIPE GRINDER

Rudolph P. Dorian, Wichita Falls, Tex.

Application June 26, 1946, Serial No. 679,467

13 Claims. (Cl. 51—241)

This invention relates to improvements in pipe grinders for grinding a bevel on or for cleaning the ends of pipe.

While grinders for grinding and cleaning the ends of pipe have been suggested heretofore, these, for the most part have not been entirely satisfactory, in-as-much as they were heavy and cumbersome, due to their design, and ineffective for performing the work to be done.

In a pipe grinder for use in pipe lines it is quite desirable to have a device that is light in construction, for portability, yet, that is sufficiently sturdy in construction and which will exert sufficient power to clean or bevel the ends of pipe efficiently and effectively, without causing undue wear on the machine itself.

The primary object of this invention is to provide a pipe grinder for pipe lines that is light in weight, easily handled, but sufficiently strong in construction and sufficiently powerful to clean or to bevel the ends of pipe.

Another object of this invention is to provide a pipe grinder for use in the field, that is easily portable, that may be put into operative position by hand, and which may be adjusted for use on various sizes of pipe.

A still further object of this invention is to provide a grinder that will clean or bevel the ends of pipe that is simple in construction, easy to operate, readily adjustable, and that is at the same time sufficiently sturdy in frame work and strong in driving power to perform efficiently the work for which it is designed.

While pipe that is to be used in a pipe line ordinarily is cut and beveled by a gas torch before it is taken out to the place of use, in order to weld the ends of the pipe together, it is necessary to clean and finish this roughly cut bevel and to remove the scale that may be present on the pipe. The present invention provides for cleaning and beveling the ends of pipe by a portable grinder that may be put into operative position readily by an operator, and yet has sufficient power to grind the pipe quickly and effectively.

This invention in one embodiment, provides for surfacing an end of a pipe by means of a flexible abrading disc or other grinding members, mounted in a head for planetary movement, which head is power driven for effective operation of said members. Provision is made for moving the members axially into engagement with the end of the pipe, and for attaching the machine to the pipe when desired. The machine is simple in construction, light in weight and easily portable.

This embodiment of this invention is illustrated in the accompanying drawings, in which:

Fig. 4 is an elevation view of the machine as mounted on a pipe, which pipe is shown in dot-dash outline;

Fig. 5 is a perspective view of the stationary ring member with parts broken away and in section to illustrate details of construction;

Fig. 6 is a cross section view therethrough taken on the line 6—6 of Fig. 5;

Figure 1:
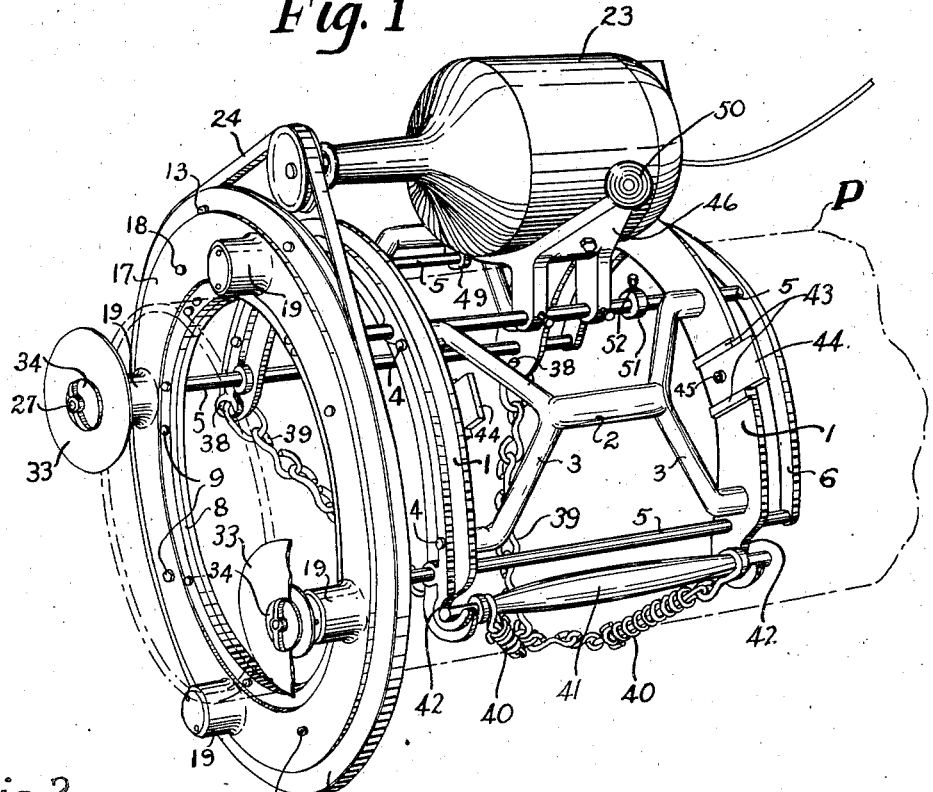
Fig. 1 is a perspective view of the pipe grinder, with a part broken away to show the details of construction, and with the machine shown mounted upon a pipe, which pipe is shown in dot-dash outline.

In the form of the invention illustrated, the machine includes a main supporting frame comprising a pair of arcuate frame members 1—1, the inner curved surfaces of which are semi-circular to extend about the outer contour of a pipe to be acted on, which pipe is designated as P. These arcuate frame members 1—1 are spaced apart and are rigidly braced by handle members 2 interposed therebetween and secured thereto. While the center portion of each handle member 2 is of suitable size and shape to be gripped by the operator for handling the machine, each end portion of the handle member is bi-furcated in a yoke 3 and secured to the respective arcuate frame members 1 by set screws 4, to hold said frame members in braced spaced relation as stated above.

Rods 5 pass through holes that are provided in frame members 1—1 and are freely slidable therein, being carried by said members. The rear ends of said rods 5 support an arcuate member 6 which is secured thereto as by cap screws 7 (Fig. 4). The forward ends of the rods 5 carry a ring 8, split transversely to the axis thereof, the portions of which are secured together by cap screws 9 (Figs. 5 and 6). Each portion of the ring 8 has a dove-tailed recess 10 therein, which recesses form a dove-tailed groove for receiving a V-belt 11. The V-belt 11 is of such length as to fit snugly around the ring 8 and form a rim thereon. The narrow edge of the V-belt is turned outward, as shown in Figs. 5 and 6.

Figure 2:
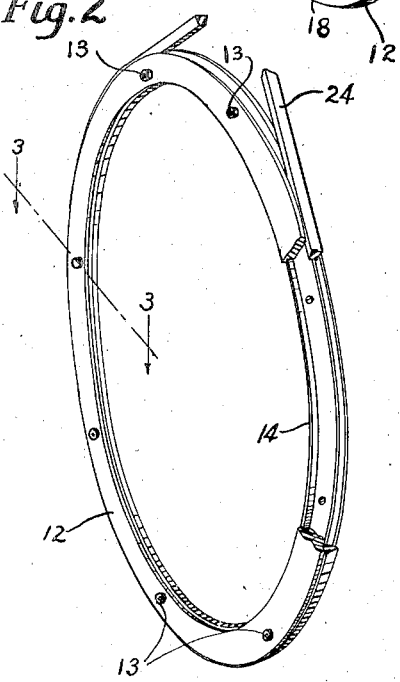
Fig. 2 is a perspective view of the drive pulley with parts broken away and in section, as removed from the machine.
Figure 3:
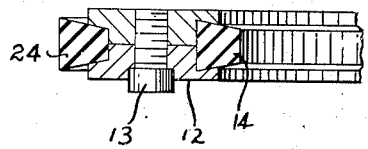
Fig. 3 is a cross section therethrough, taken on the line 3—3 of Fig. 2.
Figure 7:
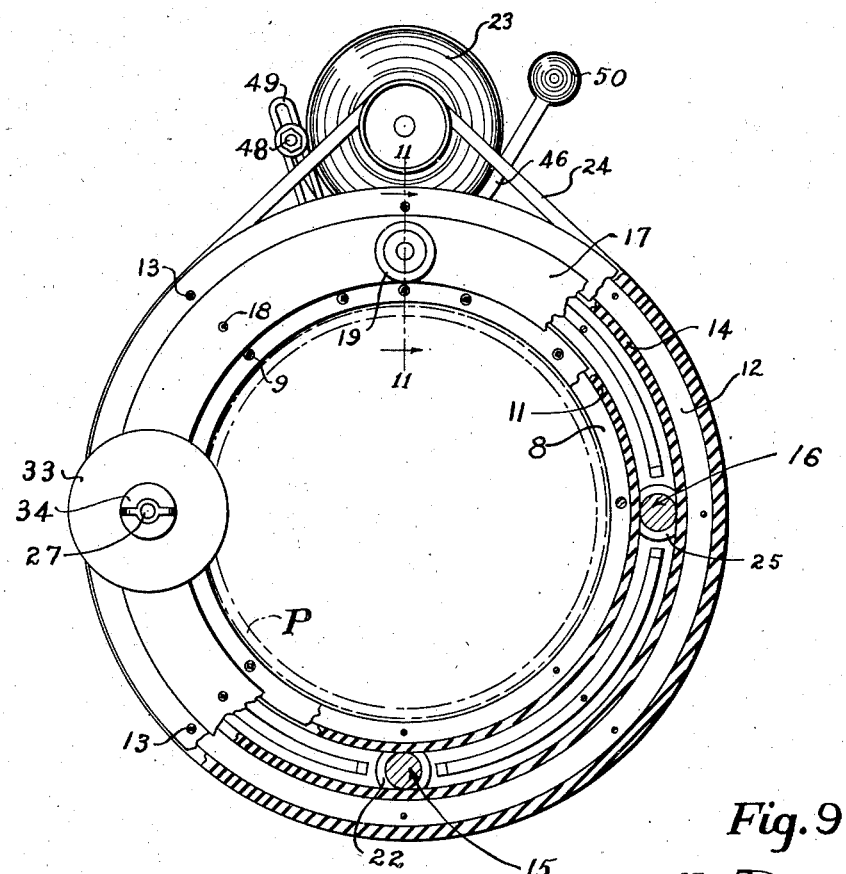
Fig. 7 is a front end view of the machine with parts broken away and in section to illustrate details of construction.

A rotary head surrounds the ring 8 and is mounted thereon. The rotary head comprises a power driven ring 12. The ring 12 is also split transversely of its axis and is composed of a pair of complementary members secured together by cap screws 13. The inner edge of this ring 12 has a recessed dove-tailed groove therein in which is secured the inside edge of a V-belt 14 (Figs. 2 and 3), which will be engaged securely within the dove-tailed groove and will project inwardly therefrom. The V-belt 14 forms an inner friction rim on the ring 12, like the friction rim formed on the ring 8 by the V-belt 11. These rings, as well as the friction rims thereof, are spaced apart radially in concentric relation, as shown in Figs. 1 and 7.

Figure 8:
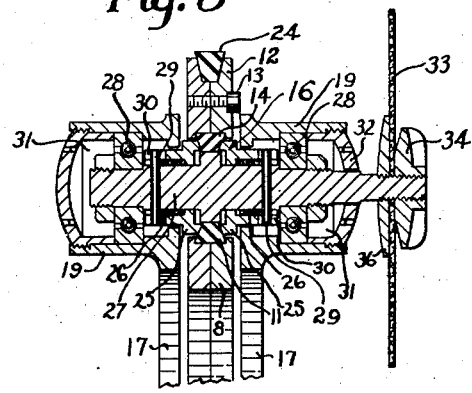
Fig. 8 is a cross section through the planetary grinding unit.
Figure 11:
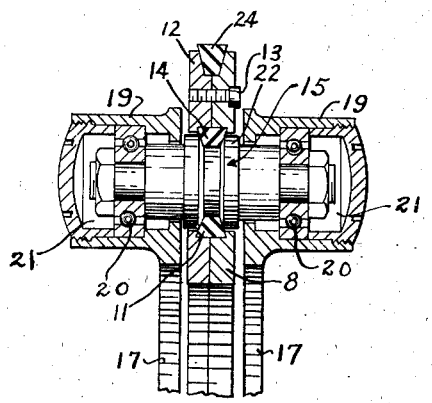
Fig. 11 is a sectional view taken on the line 11—11 of Fig. 7.

Interposed between the spaced friction rings 8 and 12 are pairs of idler and drive devices, generally designated at 15 and 16 (see Figs. 11 and 8). These operate in planetary fashion upon rotation of the rotary ring 12. These devices 15 and 16 are mounted on annular plates 17, secured together by bolts 18.

These annular plates 17 have bosses 19—19 (Fig. 11) for each idler 15 and driver 16, receiving bearings 20—20. The bearings 20—20 are mounted in chambers 21—21 which may be filled with lubricant so as to keep the bearings lubricated, if desired. A pulley 22 is journaled in the bearings 20—20, and may be made substantially in V-pulley form so as to roll between the V-belts 11 and 14. A pair of the pulleys 22 hold the rings 8 and 12 in spaced relation, while the ring 12 is being rotated by a motor 23 through a V-belt 24.

The drive device 16, Fig. 8, is composed of two clutch members 25 which are pressed inward by springs 26. The clutch members 25 are slidable on a pulley shaft 27 and will engage between belts 11 and 14 to cause the rotation of the shaft 27. The shaft 27 is journaled in bearings 28—28. Pins 29 pass through slots 30 in the outer ends of the clutch members 25 so as to pin the clutch members 25 and the shaft 27 to rotate in unison. The bearings 28—28 are mounted within chambers 31—31 which may be filled with lubricant if needed.

The inner races of the bearings 20 fit tightly on the shaft of each idler pulley 22 and are secured against relative movement by nuts screwthreaded onto the shaft. The outer races of the bearings 20 are secured in a shouldered recess of the boss 19 by a cupped nut binding the outer race within the shouldered recess. The inner races of the bearings 28 are retained on shaft 27 in a similar manner to the above and the outer races of bearings 28 are secured in bosses 19 by cupped nuts in a manner similar to that above stated. With the inner and outer races of the bearings 20 and 28 secured in the manner stated above, free rotation of the shafts is permitted.

Figure 9:
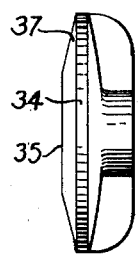
Fig. 9 is a side elevation of the abrading disc nut, detached.

One end of the shaft 27 extends outwardly through a cap 32 and has an abrasive device mounted on the outer end thereof. In the form shown, this abrasive device is preferably an abrasive disc 33 secured thereto by means of a nut 34. The nut 34 has a flat face 35 which will bindingly secure the flexible abrasive disc 33 against a washer 36. The outer portion of the end face of the nut 34 is divergent at 37, tapering to the periphery of the nut, as shown in Fig. 9. It is preferable to have this convex or divergent surface 37 so that when the abrasive disc 33 is flexed outwardly thereagainst, the disc will bend over the sloping surface and is thus prevented from being cut or broken near its center. This disc may be made of cloth, paper, rubber or other suitable flexible material.

The inner surface of the abrasive disc, that is, the surface toward the pulley, preferably is coated with abrasive so that as the abrasive disc 33 is urged against the end of the pipe, the flexible abrasive disc applies a smoothing action thereon. It is driven by the clutch members 25 engaging the sides of the belts 11 and 14. Friction is maintained thereagainst, even though the belts may wear, by the springs automatically compensating for this wear and driving the disc 33 without any appreciable slipping under normal loads. The clutch members 25 serve also as spacers to keep the rings 8 and 12 uniformly spaced apart in the same manner as the pulleys 22.

It is preferable to have the frame work of this machine made of a material that is light in weight, such as aluminum, so that it can be handled readily and be placed upon or removed from the pipe manually. Handles 2 have forked ends 3 secured to the frame members 1—1. These forked ends 3 serve as braces and as means for securing the handles 2 to the frame members 1—1. The handles proper are formed each of a single rounded member between the forked ends to permit the manual gripping of the handles for lifting the machine and moving it from place to place.

Figure 10:
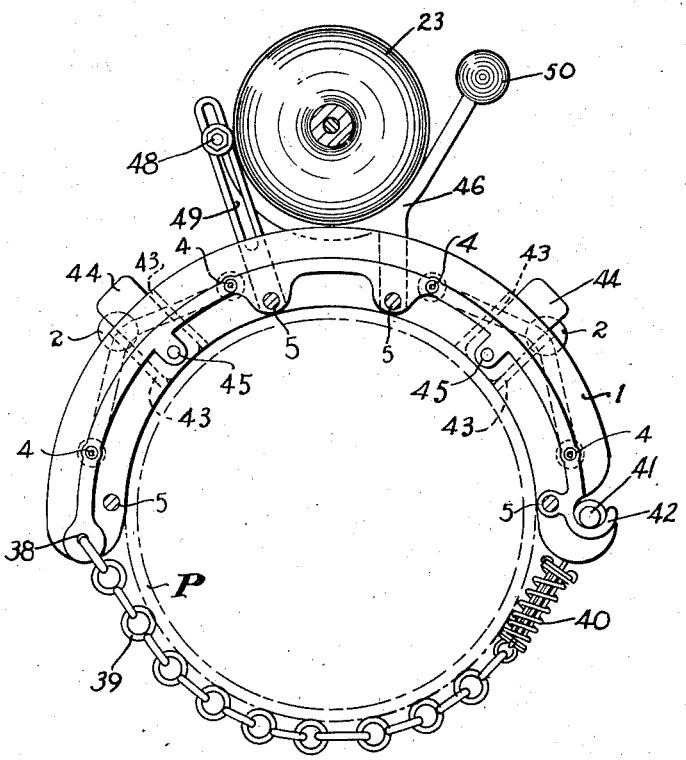
Fig. 10 is a cross section through the machine, taken on the line 10—10 of Fig. 4.

The arcuate frame members 1—1 have holes 38 at one end thereof (Fig. 10), which holes receive the ends of chain sections 39. The chain sections 39 are coupled together substantially in X-shape, as shown in Fig. 1, to form a chain device. The opposite end of the chain device has resilient members 40 attached thereto, which resilient members 40 are also connected with spaced portions of a bar 41, the ends of which bar 41 are adapted to engage hooks or catches 42 on the opposite ends of the arcuate frame members 1—1 from the holes 38.

The arcuate frame members 1—1 have radial guides 43 (Figs. 1 and 10) at spaced points to receive spacer plates 44. Usually these spacer plates have one hole each therethrough and through which a bolt 45 secures the spacer to the frame member 1, so as to hold the main frame in a definite spaced relation to the pipe P. In order to prevent accidental maladjustment of these plates, one hole is provided so that the plate 44, when turned in one direction, will fit one size pipe, and when turned in the opposite direction will fit pipe of a different size, whereby to position the machine properly on the pipe.

The motor 23, which may be of any conventional type that is suitable for the purpose, is mounted in a cradle 46 and is secured thereto by means of bolts 47. The cradle 46 is pivoted on one of the longitudinal rods 5 which extend between arcuate members 1 and the stationary ring 8. The tightness of the belt 24 may be adjusted by swinging the motor 23 and mounting cradle 46 about its axis on one rod 5, and when the proper adjustment is obtained a bolt 48 is used to bindingly engage with a slotted arm 49 to hold the motor 23 in the adjusted position. The arm 49 is secured to another of the rods 5 beneath the motor adjacent the top of the machine.

The cradle 46 preferably has a handle 50 protruding therefrom and which the operator may grip in order to move the motor 23 and the rods 5 axially relative to the arcuate frame members 1—1 so that the abrasive disc 33 will engage the end of the pipe P. A set collar 51 is positioned on the rod 5 and secured thereto by set screws 52 to limit the longitudinal movement of the motor 23 and the mechanism connected therewith.

For purpose of illustration, the motor 23 is shown as bolted to the cradle 46, however, the motor housing and the cradle or support may be made integral, if desired.

In the operation of the machine, the spacers 44 are properly adjusted in either position, so that the device will fit properly upon the pipe on which the operation is to be performed. Once these spacers are adjusted in the proper manner, no further adjustment will be necessary as long as the machine is used on pipe of the same size. The machine is then seated on top of the pipe P near an end thereof. The bar 41, which is attracted to springs 40, and chains 39 are passed beneath the pipe P and the bar 41 is pulled against the tension of the springs 40 until the ends of the bar 41 may be engaged with the hooks 42, on the ends of the arcuate frame members 1—1. This will hold the frame 1—1 securely in place on the pipe and put it in position for operation, and with the abrasive disc 33 engaging the end of the pipe P.

With the machine seated in place, the motor 23 is energized so as to rotate the ring 12, which in turn will rotate the abrasive discs 33 about the axis of the shaft 37 and also about the axis of the pipe P. By moving the handle 50 rearwardly, the inner face of the abrasive discs 33 will be caused to engage the end of the pipe P so as to act thereon and remove the scale therefrom. The pipe usually is beveled to be used in welding and it is very desirable that the scale be removed therefrom. Since the disc is flexible the continuous movement of the handle 50 will cause the abrasive discs 33 to flex about the bevel cut on the end of the pipe so as to clean the scale and other foreign matter therefrom. In moving the abrasive discs 33 against the end of the pipe, these will be caused to flex outwardly as permitted by the convex surfaces 37 on the nuts 38 without a sharp breaking action on the discs at any one point, as would be the case if the discs were gripped between two plane surfaces. However, centrifugal force exerted by the high speed of each disc, will tend to maintain the disc in a perpendicular position with respect to the shaft 27. This will tend to cause it to resist the movement out of this perpendicular alignment and considerable pressure is exerted thereby on the end of the pipe, yet sufficient flexibility is inherent so as to permit the disc to grind over and around the rough spots on the end of the pipe P without causing any serious effect on the abrasive disc 33.

The gripping of the belts 11 and 14 by the spring pressed clutch member 25 will give a uniform frictional contact with the belts 11 and 14 for driving the shaft 27, and abrasive discs 33, and with a plurality of idlers and drive units 15 and 16 spaced around the ring 12, uniform driving of the discs is assured.

It is preferable that the machine be made of light weight material, such as aluminium, or other suitable material, and that it is entirely free of gears which cause excessive wear and noise, and the teeth of which are subject to becoming stripped. It is to be pointed out that the parts of the unit are easily assembled and disassembled and that a driving relation is maintained between the motor and the abrasive discs in a uniform frictional manner, yet is sufficiently positive to operate the discs at high speed in order to perform the required cutting action upon the end of the pipe P. The machine will operate as described to clean the end surface of the pipe, either normal to the axis or beveled according to the character of abrasive device used. Thereafter it may be removed readily from the pipe by disconnecting the chain device 39—41, after which the machine may be lifted off, either by one man or two men, and carried to the next point of use. The construction is light in weight so as to be readily portable, and inexpensive to manufacture. It is effective for the purpose and may be used at any desired point.

I claim:

1. In a machine for grinding a beveled end of a pipe, a shaft, and a flexible abrasive disc on the shaft and positioned edgewise relative thereto in position for engagement by a side face thereof with the beveled end of the pipe and means for securing the disc on the shaft including a nut at the opposite side face of the disc from the engaging face thereof, said nut having a beveled edge portion for deflection of the disc thereover without breaking, said nut being appreciably smaller in diameter than the diameter of said abrasive disc so as to allow the flexing of the outer periphery thereof beyond the diameter of said nut upon engagement with said pipe.

2. In a machine for grinding the beveled end of a pipe, a frame adapted to be seated on the pipe and carrying a shaft, and a flexible abrasive disc on the shaft and positioned edgewise relative thereto in position for engagement by a side face thereof with the beveled end of the pipe and means for securing the disc on the shaft including a nut at the opposite side face of the disc from the engaging face thereof, said nut of appreciably smaller diameter than said flexible abrasive disc and having a beveled edge portion for deflection of the disc thereover without breaking when the periphery of the disc contacts the work beyond the outer periphery of said nut, and means for moving the shaft axially to cause engagement of the disc with the beveled end of the pipe.

3. In a machine for grinding an end of a pipe, the combination of a main frame including spaced arcuate frame members adapted to be mounted on a pipe, abrasive means carried thereby, and a flexible device for securing the main frame on the pipe, said flexible device being connected with the arcuate frame members at one end thereof, each of said arcuate members having a catch at the opposite end thereof, and a bar connected with the flexible device and detachably engaging the catches.

4. In a machine for grinding the end of pipe, the combination of a main frame including spaced arcuate frame members adapted to be mounted on a pipe, abrasive means carried thereby, and a flexible device for securing the main frame on the pipe, said flexible device being mounted with the arcuate frame members at one end thereof, each of said arcuate members having a catch at the opposite end thereof, and a bar connected with the flexible device and detachably engaging the catches, said flexible device having spaced end portions and yieldable means connecting said end portions with opposite end portions of the bar.

5. In a machine for grinding an end of a pipe, the combination of a main frame including spaced frame members adapted to be mounted on a pipe, handle members extending between the frame members at opposite sides of the main frame and constructed to form handles intermediate the members for manual lifting of the frame, each of said handle members having yokes at opposite ends thereof bearing against the inner sides of the frame members, and means for securing said handle members rigidly to the frame members.

6. In a machine for grinding the end of pipe, the combination of a main frame including spaced frame members adapted to be mounted on a pipe, a pair of rods extending slidably through the frame members, operable abrasive means connected with said rods for engaging an end of the pipe, a motor having a driving connection with said abrasive means, a cradle supporting said motor, means pivotally mounting said cradle on one of said rods, and means forming an adjustable connection between said cradle and the other rod to adjust the driving connection with the abrasive means.

7. In a machine for grinding the end of pipe, the combination of a main frame including spaced frame members adapted to be mounted on a pipe, a pair of rods extending slidably through the frame members, operable abrasive means connected with said rods for engaging an end of the pipe, a motor having a driving connection with said abrasive means, a cradle supporting said motor and mounted on one of said rods, and a handle connected with the cradle for moving said motor and the abrasive means axially relative to the pipe.

8. In a machine for grinding an end of pipe, a frame comprising end members spaced apart and secured in opposed relation by an interconnecting member, a second frame mounted on said first mentioned frame and movable with respect thereto, a motor mounted on the second frame, an annular member driven by said motor, a grinding element for grinding an end of said pipe and having a driving connection with the annular member and a handle connected with said second frame for moving the motor and grinding element longitudinally of the pipe so as to position the grinding element to engage an end of said pipe.

9. In a machine for grinding the ends of pipe, a frame adapted to seat on top of said pipe near an end thereof, a second frame mounted on said first mentioned frame and movable with respect thereto, a motor, said movable frame carrying an annular ring member, a drive connection between said motor and said annular ring member for rotating said ring member about the axis of said pipe, and means for guiding said ring member including a roller mounted to move in an orbit during rotation of the ring member and means forming a yieldable rotary connection between said ring member and the roller to cause a driving action of said roller.

10. In a machine for grinding the end of a pipe, a frame adapted to seat upon the top of said pipe near an end thereof, means for securing said frame to said pipe, a second frame mounted on said first-mentioned frame and carrying a motor and an annular stationary ring, a rotatable ring concentric with said stationary ring, a drive connection between said motor and said annular rotatable ring for rotating said ring about the axis of said pipe, rollers interposed therebetween for holding said annular rotatable ring and said stationary ring in spaced relation, a rotatable structure disposed intermediate said annular rotatable ring and said annular stationary ring and carrying the plurality of rollers, anti-friction bearings within said rotatable structure journaling said rollers, a shaft for rotation about axes parallel with the axis of said pipe, one or more of said rollers carrying rotating shafts which protrude outwardly from said rotatable structure and having a grinding element thereon, means for securing said grinding element to said shaft.

11. In a machine for grinding the end of a pipe, a rotating head comprising spaced concentric rings, a plurality of rollers interposed between said rings and holding the rings spaced for relative rotation, one of said rollers including axially projecting portions, bearing boxes fixed to one of the rings and enclosing said axially projecting portions, an anti-friction bearing mounted in the bearing boxes and journaling the projecting portions of the roller.

12. In a machine for grinding the end of a pipe, a rotating head comprising spaced concentric rings, a plurality of rollers interposed between said rings and holding the rings spaced for relative rotation, one of said rollers including axially projecting portions, bearing boxes fixed to one of the rings and enclosing said axially projecting portions, and anti-friction bearings mounted in the bearing boxes and journaling the projecting portions of the rollers, said rings having spaced friction rims thereon facing opposite sides thereof, one of the rollers having a clutch element fixed to the roller in bearing relation with said friction rims for rotation of said roller about its axis during orbital movement thereof between the rims.

13. In a machine for grinding the ends of pipe, an arcuate frame adapted to rest on the top of said pipe near an end thereof, and spacers for holding the frame in proper position relative to the pipe, each spacer including a member extending approximately radially of the frame, and a fastening spaced from the center of the spacer and securing the spacer to the frame in reversible relation so as to space said frame a different distance from said pipe when reversed to accomodate pipe of different diameters.

RUDOLPH P. DORIAN.

REFERENCES CITED

The following references are of record in the file of this patent:

UNITED STATES PATENTS

| Number | Name | Date |
|---|---|---|
| 445,749 | Devenport | Feb. 3, 1891 |
| 550,099 | Detrick | Nov. 19, 1895 |
| 1,026,022 | Cremean | May 14, 1912 |
| 1,902,188 | Schmidt et al. | Mar. 21, 1933 |
| 2,159,287 | Morgan | May 23, 1939 |
| 2,257,619 | Prill | Sept. 30, 1941 |
| 2,359,608 | Baur | Oct. 3, 1944 |
| 2,395,519 | Tocci-Guilbert | Feb. 26, 1946 |